US007722265B2

(12) United States Patent
Nishio

(10) Patent No.: US 7,722,265 B2
(45) Date of Patent: May 25, 2010

(54) SHUTTER DEVICE AND IMAGE PICKUP APPARATUS

(75) Inventor: Tetsuya Nishio, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 11/846,431

(22) Filed: Aug. 28, 2007

(65) Prior Publication Data

US 2008/0267615 A1 Oct. 30, 2008

(30) Foreign Application Priority Data

Aug. 29, 2006 (JP) ............................ 2006-232351

(51) Int. Cl.
*G03B 9/08* (2006.01)

(52) U.S. Cl. ...................................... 396/453; 396/454

(58) Field of Classification Search ................ 396/453, 396/454, 456
See application file for complete search history.

(56) References Cited

U.S. PATENT DOCUMENTS 6,530,703 B2 * 3/2003 Nakano et al. .............. 396/456
2007/0285551 A1 * 12/2007 Noto .......................... 348/335

FOREIGN PATENT DOCUMENTS

JP 09-005831 10/1997

* cited by examiner

*Primary Examiner*—Rodney E Fuller
(74) *Attorney, Agent, or Firm*—Canon USA Inc IP Div

(57) ABSTRACT

A shutter device makes it possible to restrict bounding of a shutter blade using a shock-absorbing member when movement of the shutter blade is completed. In addition, the shutter device makes it possible to reduce production of dust that is produced when the shock-absorbing member and the shutter blade collide with each other. Examples of dust are wear powder and flake.

8 Claims, 4 Drawing Sheets

10 11 12 13 1 9 7 8 6 3 5 4 2 14 14b 14a 16 15

SHUTTER DEVICE AND IMAGE PICKUP APPARATUS

BACKGROUND OF THE INVENTION

1. Field of the Invention

The present invention relates to a structure of a shutter device, and, more particularly, to a mechanism for preventing a shutter blade from bounding.

2. Description of the Related Art

In a related focal-plane shutter device, a shock-absorbing member for restricting bounding of a shutter blade is provided near a movement completion position of the shutter blade. When the shutter blade collides with the shock-absorbing member in a plane that is perpendicular to a movement direction of the shutter blade when the movement of the shutter blade is completed, shock generated by suddenly stopping the shutter blade is absorbed by the shock absorbing member, so that the bounding of the shutter blade occurring when the shutter blade is stopped can be restricted. Rubber is frequently used for the shock-absorbing member.

When the collision between the shutter blade and the rubber is repeated, scraping of the rubber is eventually started by the collision of the shutter blade, thereby producing wear powder. Unlike a film camera whose film can be replaced, in a digital camera, an image pickup element is accommodated in the camera body at all times. Therefore, when the wear powder adheres to the image pickup element, the wear powder may appear in an image.

To restrict the production of wear powder, Japanese Patent Laid-Open No. 09-005831 proposes a structure in which a surface of a shock-absorbing member that comes into contact with a shutter blade is covered with a material that is harder than the shock-absorbing member.

According to this structure, since the hardness of the surface of the shock-absorbing member that comes into contact with the shutter blade is made high due to the coating layer, wear powder is not produced often. In addition, shock that is produced when the shutter blade and the coating layer collide with each other can be absorbed by the rubber existing below the coating layer.

However, even if a shock-absorbing member whose rubber surface is provided with a coating layer using a material that is harder than rubber is used, the production of wear powder cannot be prevented from occurring. This is caused by the difference between the amount of deformation of the coating layer and the amount of deformation of the rubber when the shutter blade and the shock-absorbing member collide with each other.

The amount of deformation of the coating layer is less than the amount of deformation of the rubber when the shutter blade and the shock-absorbing blade collide with each other. This difference between the deformation amounts causes a force that tries to separate the coating layer and the rubber from each other to act upon the surface where the coating layer and the rubber are joined. Therefore, when the number of collisions between the shutter blade and the shock-absorbing member increases, the coating layer and the rubber are eventually peeled off from each other, thereby causing a flake of the peeled coating layer to adhere to the image pickup element.

SUMMARY OF THE INVENTION

Accordingly, the present invention is directed to a shutter device which can restrict bounding of a shutter blade using a shock-absorbing member when movement of the shutter blade is completed and which can reduce production of dust, such as wear powder or a flake, resulting from collision between the shock-absorbing member and the shutter blade.

According to an aspect of the present invention, a shutter device includes a shutter blade, a shock-absorbing member, and a blade contact member. The shock-absorbing member is configured to dampen movement of the shutter blade. The blade contact member is disposed between the shutter blade and the shock-absorbing member, and is deformable independently of the shock-absorbing member.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described in detail in accordance with the accompanying drawings.

In the figures, parts that are required to illustrate a shutter device according to the present invention are only illustrated. Accordingly, for example, a charging mechanism and a drive spring for driving a shutter blade will not be illustrated for making it easier to see the figures.

FIGS. 1 to 8 show a structure of a focal-plane shutter device, which corresponds to a shutter device according to the present invention. The focal-plane shutter device will be described as being installed in a digital single-lens reflex camera.

Figure 1:
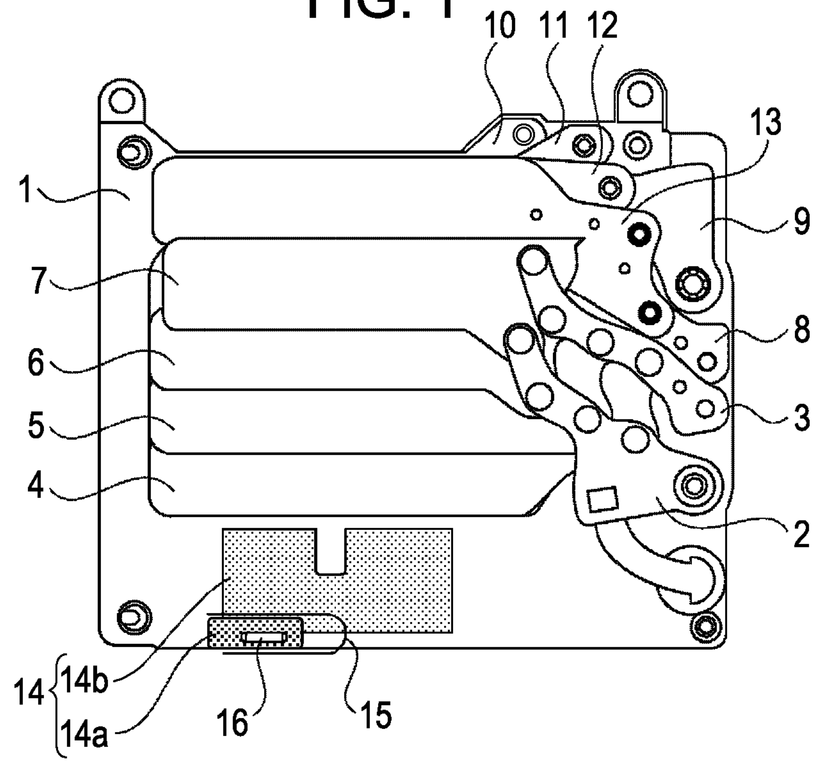
FIG. 1 is a front view of a shutter device according to an embodiment of the invention in a state in which charging of a first curtain shutter blade unit and a second curtain shutter blade unit is completed.
Figure 2:
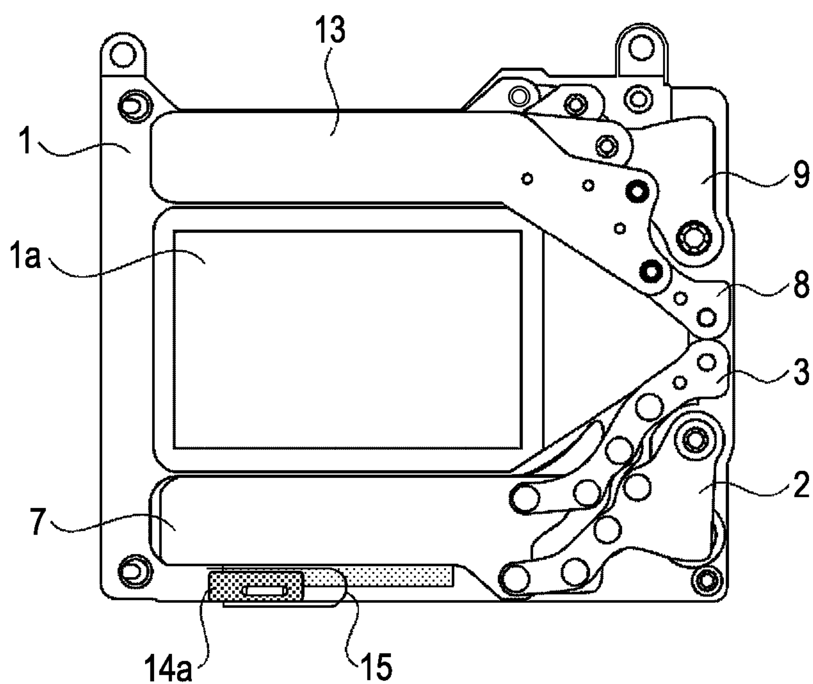
FIG. 2 is a front view of the shutter device shown in FIG. 1 in a state in which only movement of the first curtain shutter blade unit is completed.
Figure 3:
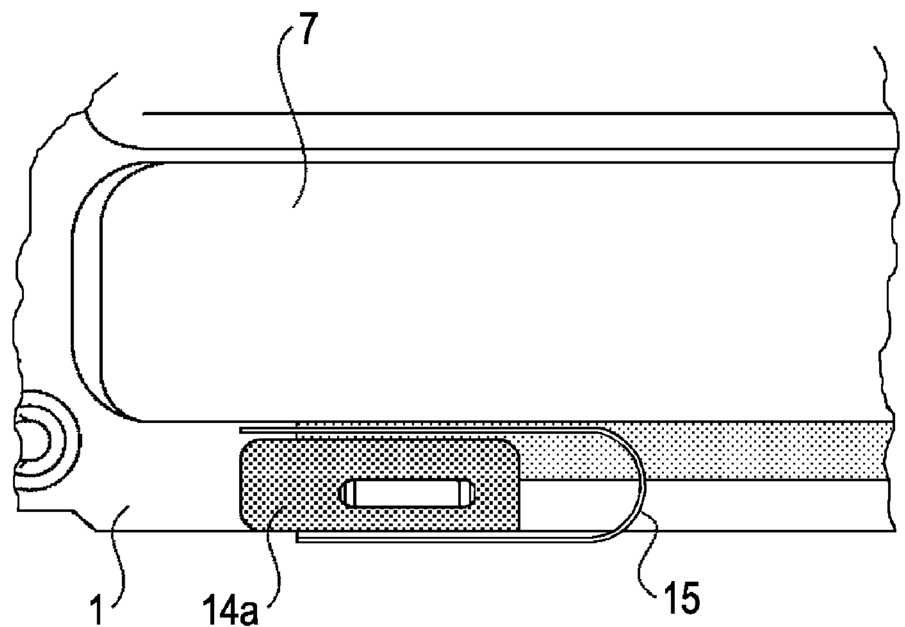
FIG. 3 is an enlarged view of a portion of the shutter device shown in FIG. 1 near a shock-absorbing member.
Figure 4:
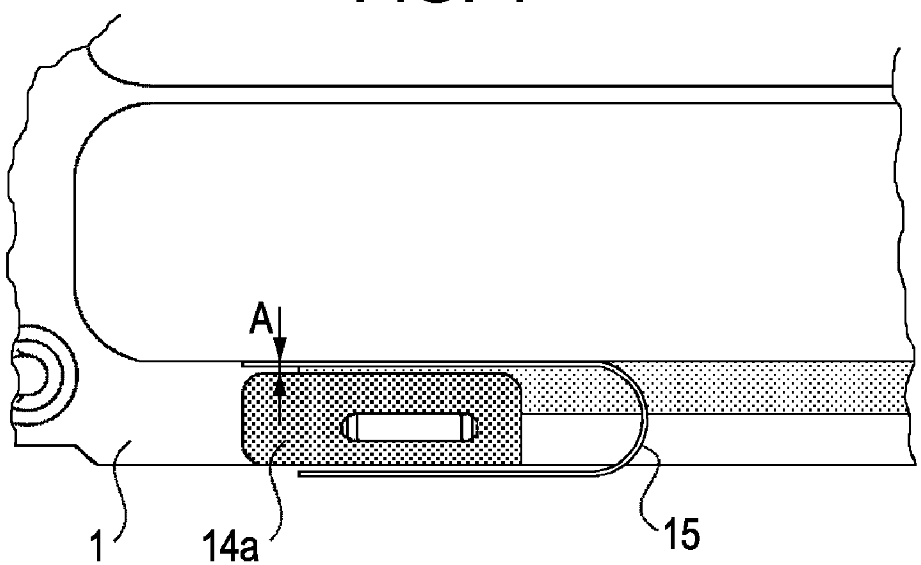
FIG. 4 is an enlarged view of the shutter device shown in FIG. 1, and shows a state in which the first curtain shutter blade unit is in contact with a blade contact member.
Figure 5:
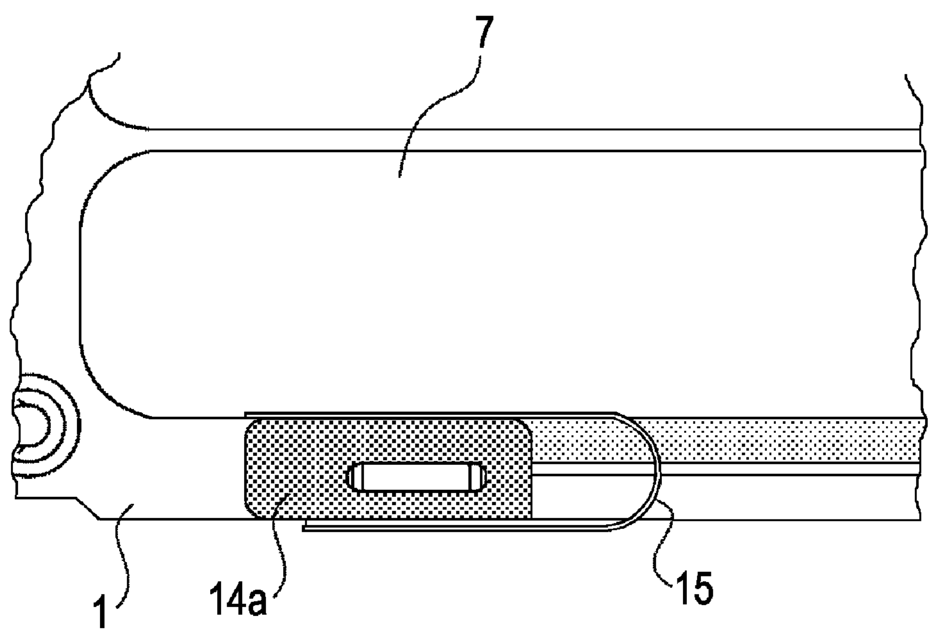
FIG. 5 is an enlarged view of the shutter device shown in FIG. 1, and shows a state in which the blade contact member is in contact with the shock-absorbing member as a result of collision of the first curtain shutter blade unit.
Figure 6:
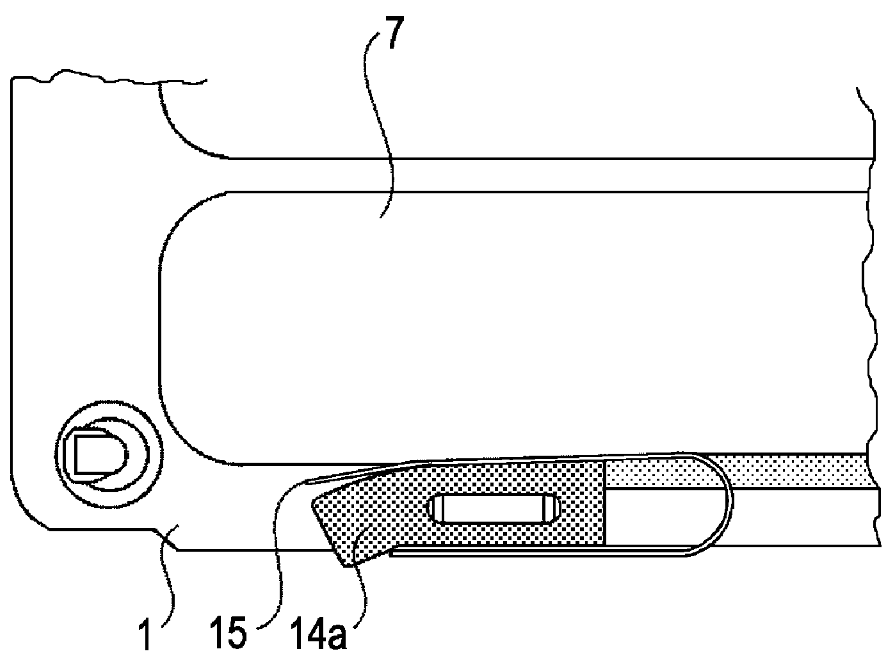
FIG. 6 is an enlarged view of the shutter device shown in FIG. 1, and shows a state in which the blade contact member and the shock-absorbing member are both deformed as a result of the collision of the first curtain shutter blade unit.
Figure 7:
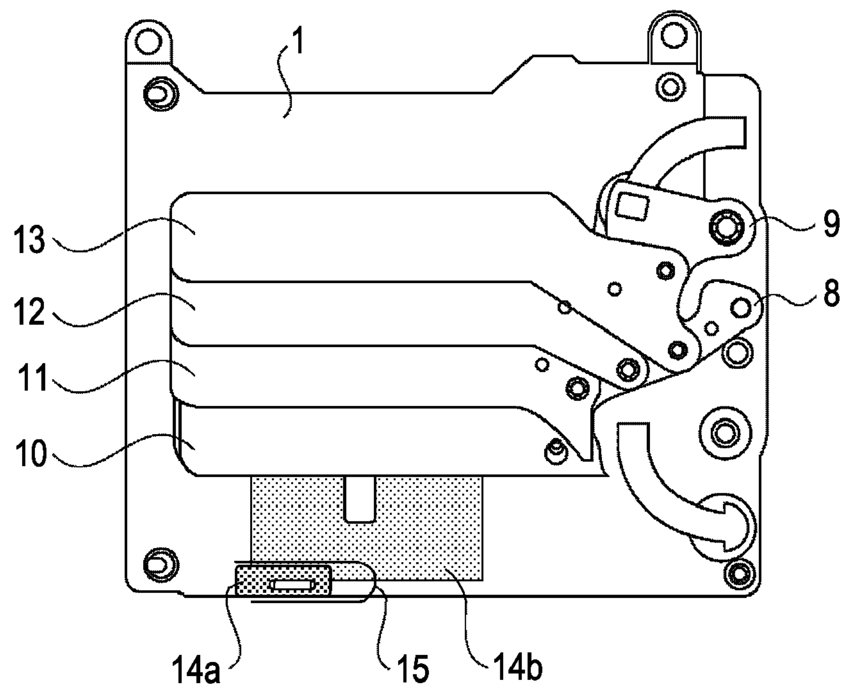
FIG. 7 is a front view of the shutter device shown in FIG. 1, and shows a state in which a shutter blade which forms a slit of the second curtain shutter blade unit is in contact with the shock-absorbing member.
Figure 8:
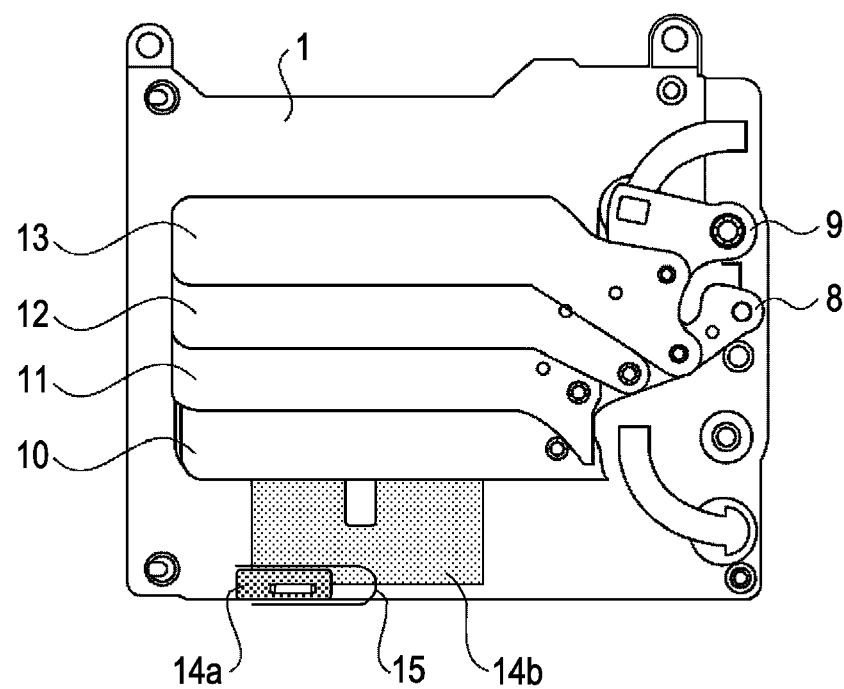
FIG. 8 is a front view of the shutter device shown in FIG. 1, and shows a state in which the second curtain shutter blade unit is at a travel completion position.

FIG. 1 is a front view of a shutter device in a state in which charging of a first curtain shutter blade unit (reference number is 4~7) and a second curtain shutter blade unit (reference number is 10~13) is completed. FIG. 2 is a front view of the shutter device in a state in which movement of the first curtain shutter blade unit from the state shown in FIG. 1 is completed. FIG. 3 is an enlarged view of a portion of the shutter device near a shock-absorbing member shown in FIG. 2 and described later. FIG. 4 is an enlarged view of a state in which the first curtain shutter blade unit is in contact with a blade contact member (described later). FIG. 5 is an enlarged view of a state in which the blade contact member is in contact with the shock-absorbing member as a result of collision of the first curtain shutter blade unit. FIG. 6 is an enlarged view of a state in which the blade contact member and the shock-absorbing member are both deformed as a result of the collision of the first curtain shutter blade unit. FIG. 7 is a front view of a state in which a shutter blade which forms a slit of the second curtain shutter blade unit is in contact with the shock-absorbing member. FIG. 8 is a front view of a state in which the second curtain shutter blade unit is at a movement completion position.

In FIGS. 1 to 8, reference numeral 1 denotes a bottom plate of the focal-plane shutter device. The bottom plate 1 has an opening 1*a* (see FIG. 2). Reference numerals 2 and 3 denote a first first-curtain drive arm and a second first-curtain drive arm, respectively, which are connected to the first curtain shutter blade unit to form parallel links and which cause the first curtain shutter blade unit to move as a result of receiving a biasing force of a first-curtain spring (not shown). Reference numerals 4 to 7 denote first curtain shutter blades of which the first curtain blade unit is formed. In a state in which charging is completed, as shown in FIG. 1, the first curtain shutter blades 4 to 7 cover the opening 1*a*. In contrast, when the movement of the first curtain shutter blade unit is completed by the biasing force of the first-curtain spring (not shown), the first curtain shutter blades 4 to 7 are withdrawn from the opening 1*a* as shown in FIG. 2. Reference numerals 8 and 9 denote a first second-curtain drive arm and a second second-curtain drive arm, respectively, which are connected to the second curtain shutter blade unit to form parallel links and which cause the second curtain shutter blade unit to move as a result of receiving biasing force of a second-curtain spring (not shown). Reference numerals 10 to 13 denote second curtain shutter blades of which the second curtain blade unit is formed. In a state in which charging is completed, the second curtain shutter blades 10 to 13 are withdrawn from the opening 1*a* as shown in FIG. 2. When the movement of the second curtain shutter blade unit is completed by the biasing force of the second-curtain spring (not shown), the second curtain shutter blades 10 to 13 cover the opening 1*a* as shown in FIG. 8. An exposure time which is controlled by the shutter device extends from a time after the rear moving first curtain shutter blade 7 in the first curtain shutter blade unit withdraws from the opening 1*a* to a time in which the front moving second curtain shutter blade 10 in the second curtain shutter blade unit covers the opening 1*a*.

Reference numeral 14 denotes a shock-absorbing member formed of a material that absorbs shock, such as an elastomer or a rubber material, such as chloroprene rubber, butyl rubber, polyurethane rubber, or silicone rubber. The shock-absorbing member 14 damps the movement of the first curtain shutter blade unit and the second curtain shutter blade unit near their movement completion positions. The shock-absorbing member 14 includes a first shock-absorbing portion 14*a* and a second shock-absorbing portion 14*b*. The first shock-absorbing portion 14*a* absorbs shock when the movement of the first curtain shutter blade unit is completed. The second shock-absorbing portion 14*b* absorbs shock when the movement of the second curtain shutter blade unit is completed. A stepped portion is provided at the first shock-absorbing portion 14*a* and the second shock-absorbing portion 14*b* in a direction that is perpendicular to a sheet plane of FIG. 1. Therefore, the first curtain shutter blade unit collides with the first shock-absorbing portion 14*a* without contacting the second shock-absorbing portion 14*b*. In addition, the second curtain shutter blade unit collides with the second shock-absorbing portion 14*b* without contacting the first shock-absorbing portion 14*a*. Reference numeral 15 denotes a blade contact member, which is secured to the bottom plate 1 and which is formed of a material, such as a thin metallic material or a plastic material having a wear resistance that is higher than that of the shock-absorbing member. The blade contact member 15 is disposed so that the first curtain shutter blade unit contacts the blade contact member 15 before the first curtain shutter blade unit collides with the first shock-absorbing portion 14*a*. Reference numeral 16 denotes a protrusion formed on the bottom plate 1. The shock-absorbing member 14 is secured to the shutter device by securing an elongated hole in the first shock-absorbing portion 14*a* to the protrusion 16. FIG. 3 shows a structure of a portion of the shutter device near the shock-absorbing member in a state in which the movement of the first curtain shutter blade unit is completed. The first curtain shutter blade unit is held without contacting the blade contact member 15, at a position that does not overlap the opening 1*a* of the bottom plate 1.

Next, an operation of the shutter device when the first curtain shutter blade unit moves will be described.

When a power supply of a camera body (not shown) is turned on and a shooting mode is set, charging is performed by a charging member (not shown), so that the first curtain shutter blade unit and the second curtain shutter blade unit are held at the positions shown in FIG. 1. When a user operates a release button (not shown), and a command for starting exposure is output from a microcomputer in the camera body, the first curtain shutter blades 4 to 7 move, reach their stopping positions shown in FIG. 2, and stop.

The operation of the first curtain shutter blade 7, the first shock-absorbing portion 14*a* of the shock-absorbing member 14, and the blade contact member 15 will be described with reference to FIGS. 4 to 6.

First, the first curtain shutter blade unit moves, so that the first curtain shutter blade 4, the first curtain shutter blade 5, the first curtain shutter blade 6, and the first curtain shutter blade 7 collide in that order with the blade contact member 15 near their movement completion positions. FIG. 4 shows the moment in which the rear moving first curtain shutter blade 7 collides with the blade contact member 15. At this time, the blade contact member 15 and the first shock-absorbing portion 14*a* are not in contact with each other, so that a gap A exists therebetween. For making it easier to see FIGS. 4 to 6, the first curtain shutter blades 4, 5, and 6 are not shown.

A shock-absorbing action of the blade contact member 15 is sufficiently smaller than that of the shock-absorbing portion 14*a*. When the blade contact member 15 receives an inertial force of the first curtain shutter blade unit, it deforms. While the first curtain shutter blade unit is in contact with the blade contact member 15, the blade contact member 15 collides with the first shock-absorbing portion 14*a*. The state at this time is shown in FIG. 5.

Here, although the movements of the first first-curtain drive arm 2 and the second first-curtain drive arm 3 are stopped by a stopper (not shown), the first curtain shutter blade unit still has inertial force. Therefore, a base side (right side in FIG. 6) of the first curtain shutter blade unit stops, but a front side (left side in FIG. 6) of the first curtain shutter blade unit tries to move further in the movement direction due to inertia. Consequently, the front side extends below the base side, thereby causing the first curtain shutter blade unit to be inclined. As a result, the blade contact member 15 and the first shock-absorbing portion 14*a* receive a force from the front side of the first curtain shutter blade unit, and are deformed. The state at this time is shown in FIG. 6. The force received from the front side of the first curtain shutter blade unit causes a large deformation to occur in sides (left sides in FIG. 6) of the blade contact member 15 and the first shock-absorbing portion 14*a* opposing the front end of the first curtain shutter blade unit. Therefore, the blade contact member 15 and the first shock-absorbing portion 14*a* opposing the front end of the first curtain shutter blade unit separate from the first curtain shutter blade unit. The deformation of the first shock-absorbing portion 14*a* attenuates travel energy of the first curtain shutter blade unit.

Here, since the materials of the blade contact member 15 and the first shock-absorbing portion 14*a* differ from each other, their deformation amounts differ. In the embodiment, since the elastic modulus of the first shock-absorbing portion 14*a* is less than the elastic modulus of the blade contact member 15, the deformation of the first shock-absorbing portion 14*a* is greater than the deformation of the blade contact member 15. Here, as shown in FIG. 6, since the blade contact member 15 and the first shock-absorbing portion 14*a* are not secured to each other, they are movable relative to each other, so that they can be deformed apart from each other. Therefore, unlike the case in which the shock-absorbing member is provided with a coating layer, the probability of a flake being peeled off from the blade contact member 15 by the deformation of the first shock-absorbing portion 14*a* and powder being scraped off from the first shock-absorbing portion 14*a* by the deformation of the blade contact member 15 is reduced. In addition, it is possible to reduce the probability of dust, produced from a mechanism that restricts bounding of a shutter blade when the movement of the shutter blade is completed, entering an image produced by an image pickup element.

After the state shown in FIG. 6, the first curtain shutter blade unit starts to move in the reverse direction towards its stopping position shown in FIG. 2. Since the travel energy is attenuated, the first curtain shutter blade unit stops before reaching the opening 1*a*. In addition, the blade contact member 15 and the first shock-absorbing portion 14*a* are restored to the shapes that they had prior to being deformed. Energy required to restore the blade contact member 15 and the first shock-absorbing portion 14*a* to their shapes that they had prior to being deformed is also attenuated, so that the force used to restore their shapes does not push the first curtain shutter blade unit upward in FIG. 6. Then, the first curtain shutter blade unit is completely stopped, and is set in the state shown in FIG. 3. As mentioned above, since the material of the blade contact member 15 has a higher wear resistance than the material of the shock-absorbing member 14, compared to the case in which the first curtain shutter blade unit directly collides with the shock-absorbing member 14, it is possible to reduce the amount of wear powder produced.

Next, the operation of the second curtain shutter blade unit and the second shock-absorbing portion 14*b* of the shock-absorbing member 14 will be described using FIGS. 7 and 8. For making it easier to see FIGS. 7 and 8, the first first-curtain drive arm 2, the second first-curtain drive arm 3, and the first curtain shutter blade unit are not shown.

When the second curtain shutter blade unit starts moving and reaches its movement completion position, the movements of the first second-curtain drive arm 8 and the second second-curtain drive arm 9 are stopped by a stopper (not shown). At this time, the second curtain shutter blade unit moves beyond its stopping position due to inertia, so that the front moving second curtain shutter blade 10 collides with the second shock-absorbing portion 14*b*. The state at this time is shown in FIG. 7.

The second shock-absorbing portion 14*b* with which the second curtain shutter blade 10 has collided is deformed. This deformation attenuates travel energy of the second curtain shutter blade unit. As shown in FIG. 7, when the second curtain shutter blade unit moves, the second curtain shutter blades 10 to 13 that are superimposed upon each other spread out, so that only the second curtain shutter blade 10 of the second curtain shutter blade unit collides with the second shock-absorbing portion 14*b*. Therefore, collision energy is smaller than that of the first curtain shutter blade unit. Even if the second curtain shutter blade 10 directly collides with the shock-absorbing portion 14*b*, wear powder of the second shock-absorbing portion 14*b* is rarely produced. As a result, in the embodiment, a blade contact member 15 is not provided at the second shock-absorbing portion 14*b*, so that the second curtain shutter blade 10 directly contacts the second shock-absorbing portion 14*b*.

The second curtain shutter blade unit whose travel energy is attenuated moves towards its stopping position, and is held at its stopping position shown in FIG. 8. Since, when the travel speed of the second curtain shutter blade unit is increased, the travel energy of the second curtain shutter blade unit becomes sufficiently large, a blade contact member 15 may be provided at the second shock-absorbing portion 14*b* as appropriate.

Although, in the embodiment, when the first curtain shutter blade unit is not in contact with the blade contact member 15, a gap is formed between the blade contact member 15 and the first shock-absorbing portion 14*a*, the invention is not limited thereto. As long as the blade contact member 15 and the first shock-absorbing portion 14*a* are independently deformable (or movable), the blade contact member 15 and the first shock-absorbing portion 14*a* may be in contact with each other before the first curtain shutter blade unit moves.

In addition, although, in the embodiment, the first shock-absorbing portion 14*a* is deformed after the first curtain shutter blade 7 collides with the blade contact member 15, the invention is not limited thereto. The first shock-absorbing portion 14*a* may start deforming by a force that is produced when the first curtain shutter blade 6 or 5 collides with the blade contact member 15. Further, the number of shutter blades making up each of the first curtain shutter blade unit and the second curtain shutter blade unit is not limited to 4, so that 3 or 5 shutter blades may be used.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-232351 filed Aug. 29, 2006, which is hereby incorporated by reference herein in its entirety.

What is claimed is:

1. A shutter device comprising:

a shutter blade;

a shock-absorbing member configured to absord shock when movement of the shutter blade is completed; and a blade contact member configured to contact the shutter blade by covering a surface of the shock-absorbing member to prevent the shutter blade from directly contacting the shock-absorbing member, wherein the blade contact member is not joined to the shock-absorbing member.

2. The shutter device according to claim 1, wherein the blade contact member is formed of a material having a wear resistance that is greater than that of the shock-absorbing member.

3. The shutter device according to claim 1, wherein the shock-absorbing member is deformed by deformation of the blade contact member resulting from collision of the shutter blade with the blade contact member.

4. The shutter device according to claim 1, wherein after the shutter blade collides with the blade contact member, the blade contact member collides with the shock-absorbing member.

5. The shutter device according to claim 1, wherein the shutter blade comprises a plurality of shutter blades including a first curtain shutter blade unit that moves from a position where the first curtain shutter blade unit covers an opening to a position where the first curtain shutter blade unit withdraws from the opening.

6. The shutter device according to claim 1, wherein an elastic modulus of the shock-absorbing member is less than an elastic modulus of the blade contact member.

7. The shutter device according to claim 1, wherein there is a gap between the blade contact member and the shock-absorbing member before completing the movement of the shutter blade.

8. A shutter device comprising:

a first curtain shutter blade unit that moves from a position where the first curtain shutter blade unit covers an opening to a position where the first curtain shutter blade unit withdraws from the opening;

a first shock-absorbing member configured to absorb shock when movement of the first curtain shutter blade unit is completed;

a blade contact member configured to contact the first curtain shutter blade unit by covering a surface of the first shock-absorbing member to prevent the first curtain shutter blade unit from directly contacting the first shock-absorbing member, wherein the blade contact member is not joined to the first shock-absorbing member, and the blade contact member being formed of a material having a wear resistance that is greater than that of the first shock-absorbing member;

a second curtain shutter blade unit that moves from a position where the second curtain shutter blade unit withdraws from the opening to a position where the second curtain shutter blade unit covers the opening; and a second shock-absorbing member configured to absorb shock when movement of the second curtain shutter blade unit, the second shock-absorbing member being formed of the same material as the first shock-absorbing member.

* * * * *